United States Patent [19]

Ando et al.

[11] Patent Number: 4,874,659
[45] Date of Patent: Oct. 17, 1989

[54] ELECTRET FIBER SHEET AND METHOD OF PRODUCING SAME

[75] Inventors: Katsutoshi Ando, Otsu; Yo Ogawa, Kusatsu, both of Japan

[73] Assignee: Toray Industries, Tokyo, Japan

[21] Appl. No.: 790,572

[22] Filed: Oct. 23, 1985

[30] Foreign Application Priority Data

Oct. 24, 1984 [JP] Japan ............................... 59-221976
Jan. 30, 1985 [JP] Japan ................................. 59-14396

[51] Int. Cl.$^4$ .................. B30C 3/00; B29C 71/04; B32B 33/00; C07C 3/24
[52] U.S. Cl. ..................................... 428/221; 55/103; 55/155; 55/528; 55/DIG. 39; 428/284; 428/286; 428/287; 428/296; 428/409; 623/16; 128/206.19; 128/205.29; 204/165; 204/168; 204/169; 264/22; 307/400; 369/144; 381/187; 381/191
[58] Field of Search ......... 55/103, 155, 528, DIG. 39; 204/165, 168, 169; 264/22; 307/400; 369/144; 428/221, 296, 409, 284

[56] References Cited

U.S. PATENT DOCUMENTS

| Re. 30,782 | 10/1981 | Von Turnhout | 264/22 |
|---|---|---|---|
| Re. 31,285 | 6/1983 | Von Turnhout et al. | 264/22 |
| Re. 32,171 | 6/1986 | Von Turnhout | 264/22 |
| 3,379,811 | 4/1968 | Hartman . | |
| 3,571,679 | 3/1971 | Turnhout . | |
| 3,978,185 | 8/1976 | Buntin . | |
| 3,998,916 | 12/1976 | von Turnhout | 264/22 |
| 4,091,140 | 5/1978 | Harmon . | |
| 4,215,682 | 8/1980 | Kubik | 128/205.29 |
| 4,375,718 | 3/1983 | Wadsworth et al. | 264/22 |
| 4,456,648 | 6/1984 | Adamse et al. | 428/921 |
| 4,588,537 | 5/1986 | Klaase et al. | 264/22 |
| 4,592,815 | 6/1986 | Nakao | 264/22 |
| 4,623,438 | 11/1986 | Felton et al. | 428/397 |
| 4,789,504 | 12/1988 | Ohmori et al. | 204/22 |

FOREIGN PATENT DOCUMENTS 53-41369 4/1978 Japan .
57-101073 6/1982 Japan .
59-15168 4/1984 Japan .

Primary Examiner—James C. Cannon
Attorney, Agent, or Firm—Armstrong, Nikaido, Marmelstein, Kubovcik & Murray

[57] ABSTRACT

An electret fiber sheet has polarized charges on its surface and preferably has charges in ordered orientation across it. The polarized charges are present in an amount of at least $7 \times 10^{-11}$ C/cm$^2$. Such sheets are formed to have a dust collecting efficiency. Sheets having an amount of polarized charge even as high as this are nevertheless stable when they have a maximum orientation energy of depolarization of at least 0.2 eV.

Such an electret sheet can be obtained by a process comprising placing a fiber sheet between a non-contact type voltage-application electrode and an earth electrode confronting each other and supplying electricity (voltage > 3 kV; current density > $1 \times 10^{-6}$ mA/cm$^2$) between the electrodes, provided that the fiber sheet has a weight less than 80 g/m$^2$ and a covering factor at least 60%.

The electret fiber sheet is useful in a variety of applications, such as filter materials, especially for collection of micro dust; clothing and furniture apparel for industrial clean rooms; adsorbing materials; and medical materials such as masks and collectors of bacillus.

18 Claims, 11 Drawing Sheets

ELECTRET FIBER SHEET AND METHOD OF PRODUCING SAME

BACKGROUND OF THE INVENTION

1 Field of the Invention

The present invention relates to an electret fiber sheet and a method of producing it.

2 Description of the Prior Art

Known electrets are described in U.S. Pat. Nos. 3998916 and 4215682. The former disclosed a web formed from a fiber prepared by cutting an electret film, while the latter discloses a web prepared by forming an electret fiber during spinning and collecting the same on a conveyer.

Both of these known electrets have random orientation of polarized charges in the sheet, since they are formed into a web by dispersing electret fibers with random direction of polarization. Thus the charges are mutually weakened or offset disadvantageously. Therefore, the electric field strength of such an electret is low, and the charges therein disadvantageously are weakened with the lapse of time.

On the other hand, a method of making electret fiber sheet by applying high voltage to a fiber sheet with contact type voltage-application electrode is described in JA-B-4433/74, however in this method the amount of polarized charge is not large.

The present invention aims at providing an electret having an excellent stability which cannot be expected from conventional electrets and an ability to retain high charges over a long period of time.

SUMMARY OF THE INVENTION

Aspects of the present invention are:

1. An electret fiber sheet having polarized charges on the surfaces thereof, the maximum activation energy of depolarization of the sheet being at least 0.2 eV.

2. An electret fiber sheet having polarized charges on the surfaces thereof, and preferably an ordered orientation of charges across the sheet, the total charge per unit area of the sheet being at least $7 \times 10^{-11}$ c/m².

3. A process for producing an electret fiber sheet comprising placing a fiber sheet between a non-contact type voltage-application electrode and an earth electrode confronting each other and applying voltage of at least 3kV/cm at an electric current density of from $10^{-6}$ to $10^{-2}$ mA/cm² inclusive between both of said electrodes, the fiber sheet having a weight no more than 80 g/m² and a covering factor of at least 60%.

A supplemental material which may be a solid block or sheet, or which may be a liquid, may be placed between the fiber sheet and the earth electrode, in which case the supplemental material should have a volume resistivity higher than that of the earth electrode and lower than that of the fiber sheet, say greater than $10^{-1}$ Ω.cm, preferably $10^1$ to $10^{-10}$ Ω.cm, more preferably $10^1$ to $10^8$ Ω.cm, especially $10^2$ to $10^6$ Ω.cm.

The process of the invention allows the formation of an electret fiber sheet in which the charges are present deep within the interior of the sheet, are disposed in an ordered orientation across the thickness of the sheet and are retained by the sheet over a particularly long period of time so that the sheet has a particularly long life span.

BRIEF DESCRIPTION OF THE DRAWINGS

In the drawings:

In FIGS. 1 and 5, numerals refer to the following:

1: polarized charges
2: electret sheet

Figure 1:
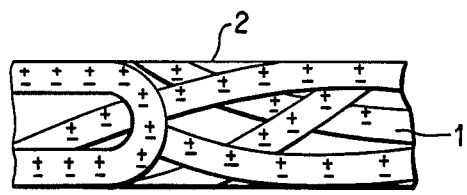
FIGS. 1 and 5 show what we believe a possible pattern of distribution in a cross-section of an electret fiber sheet embodying this invention (though we are uncertain as to the charge distribution between the fabric surfaces).
Figure 2:
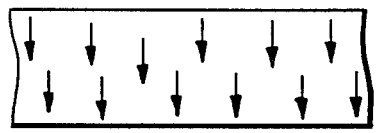
Figure 5:
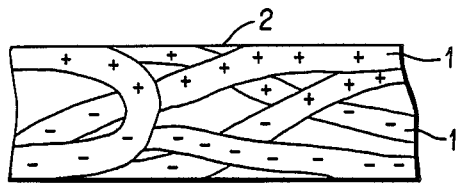

FIG. 2 is a simplified illustration showing lines of electric power vectors (arrows) in the cross-section of the fiber sheet of FIGS. 1 and 5.

Figure 3:
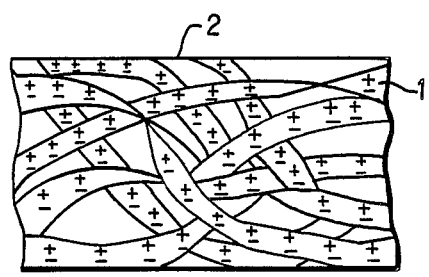

FIG. 3 shows the distribution of polarized charges in a cross-section of a conventional electret fiber sheet.

Figure 4:
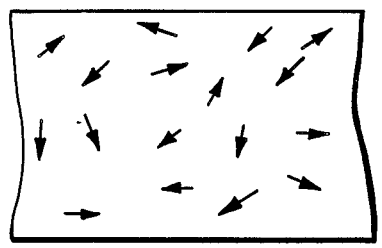

FIG. 4 is a simplified illustration showing lines of electric power vectors in the cross-section of the conventional electret fiber sheet of FIG. 3.

Figure 6:
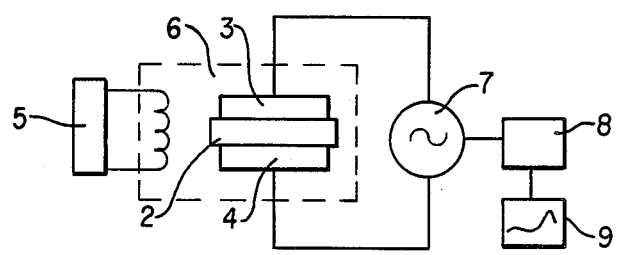
Figure 7:
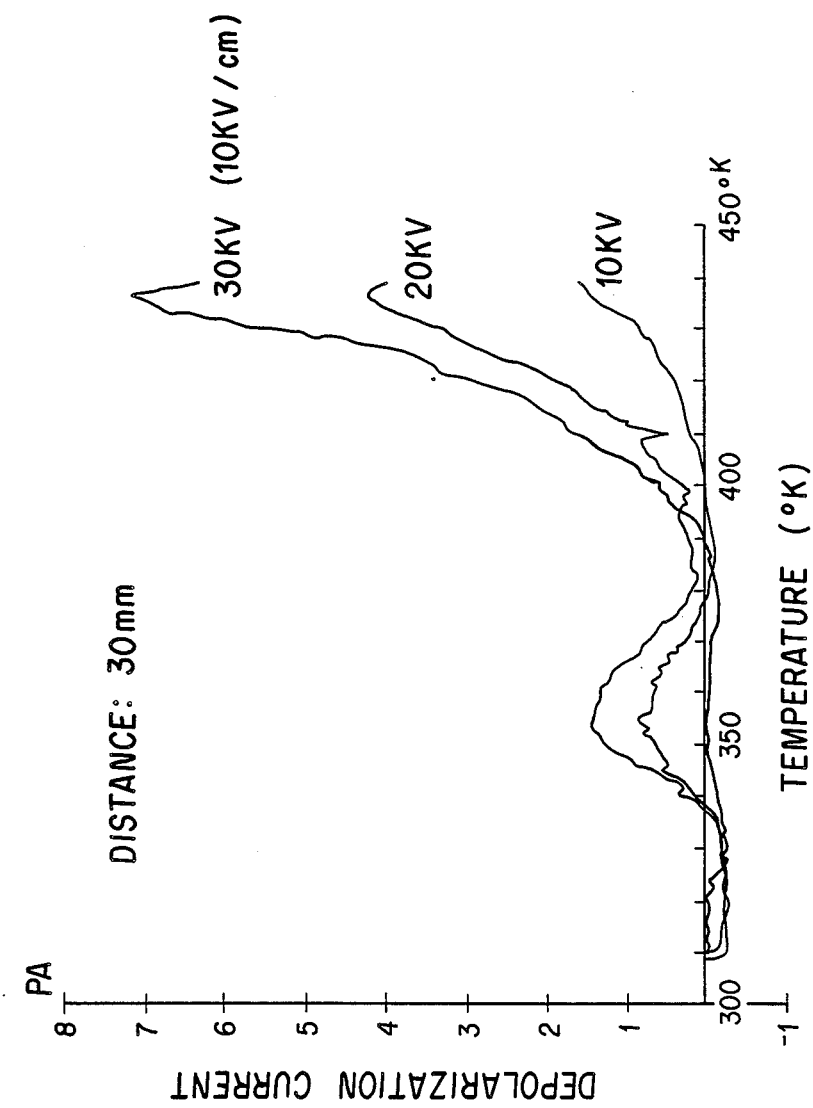

FIG. 6 is a typical illustration showing equipment for measurement of the amount of polarized charges and activation energy. In FIG. 6, numerals refer to the following:

3,4: electrodes
5: temperature controller
6: heating oven
7: high-sensitivity ammeter
8: data processing unit
9: recorder FIG. 7 shows respective depolarization current curves for three examples of electret fiber sheet embodying this invention.

Figure 8:
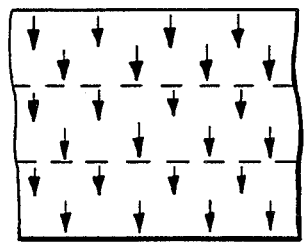

FIG. 8 is a simplified illustration showing lines of electric power vectors in a cross-section of a laminate structure comprising three layer each of an electret fiber sheet embodying this invention.

Figure 9:
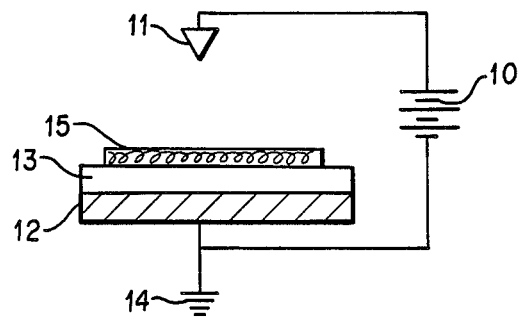
Figure 10:
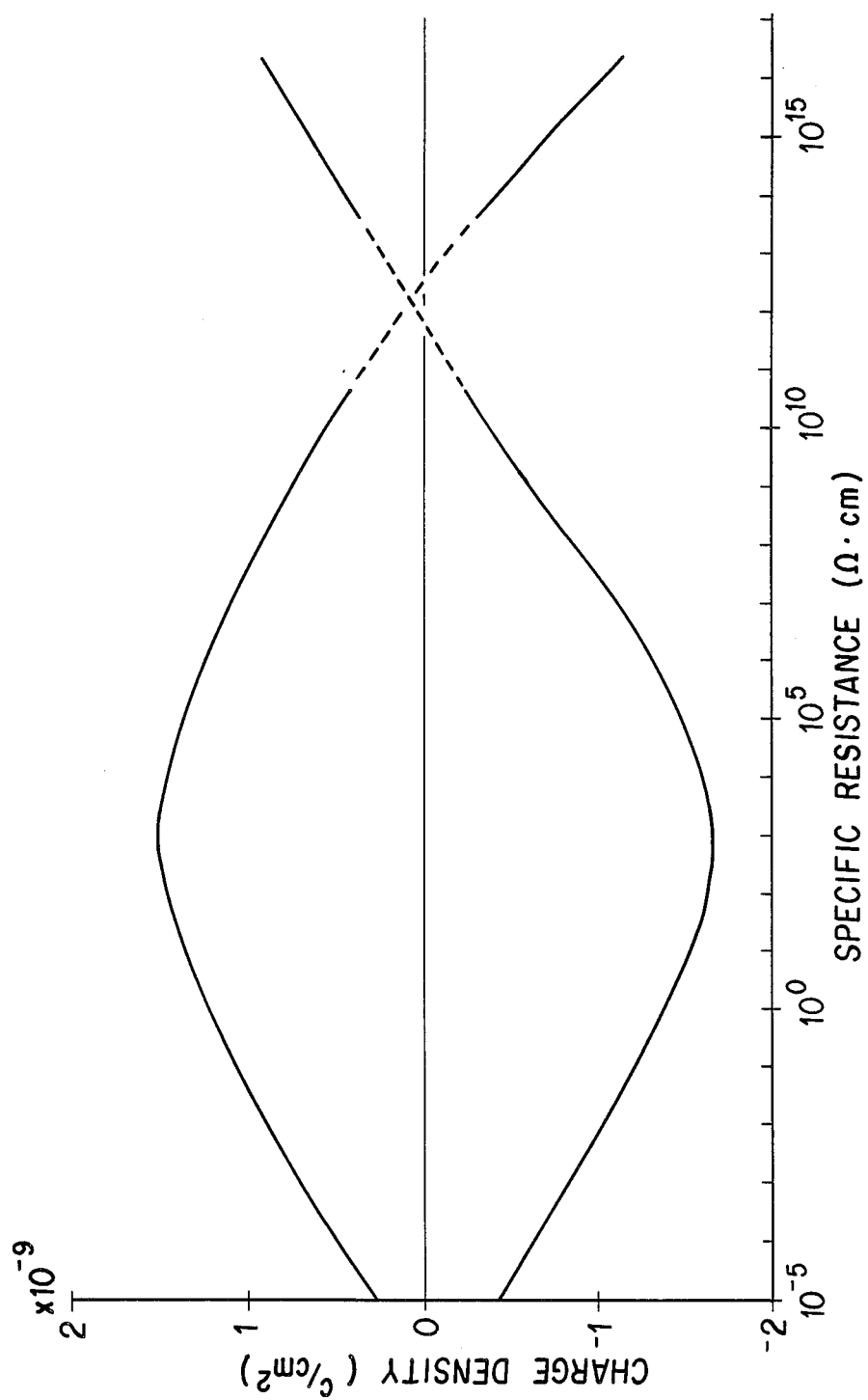

FIG. 9 is a simplified cross-sectional illustration showing a typical example of equipment for producing the electret fiber sheet embodying this invention. In FIG. 9, numerals refer to the following:

10: high voltage generator
11: non-contact needle electrode
12: earth electrode
13: supplemental material
14: earth
15: fiber sheet FIG. 10 shows respective curves representing the relation between surface charge density and specific resistance (ie. volume resistivity) of opposite surfaces of a typical supplemental material for use in the equipment of FIG. 9.

Figure 11:
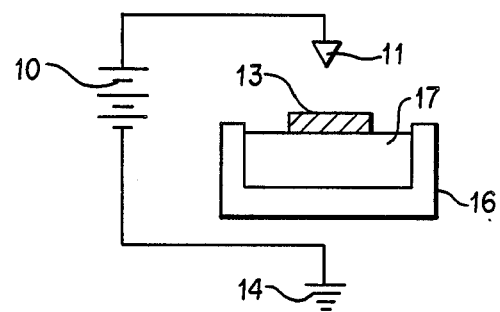
Figure 12:

FIG. 11 is a simplified cross-sectional illustration showing an alternative example of equipment to that shown in FIG. 9 for producing an electret fiber sheet embodying this invention. In FIG. 11, numerals refer to the following:

10: high voltage generator
11: non-contact needle electrode
13: fiber sheet
14: earth
16: metal container
17: liquid electrode FIG. 12 illustrate a desired state of contact of the fiber sheet with the liquid electrode when carrying out a process embodying this invention using the equipment of FIG. 11.

Figure 13:
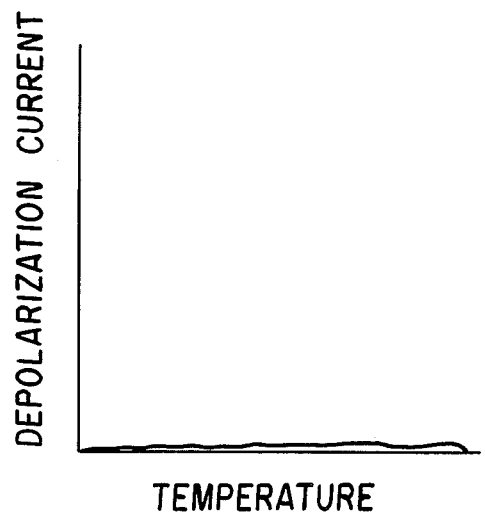

FIG. 13 is a graph of depolarization current versus temperature for a conventional electret fiber sheet.

Figure 14:
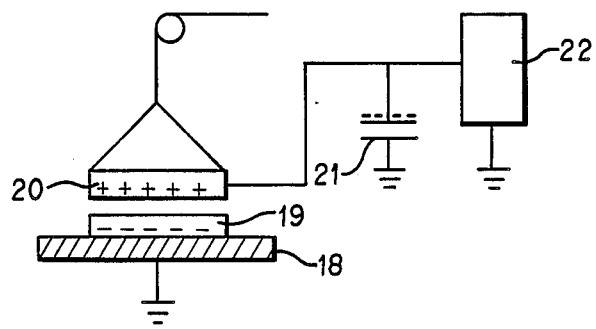
Figure 15:
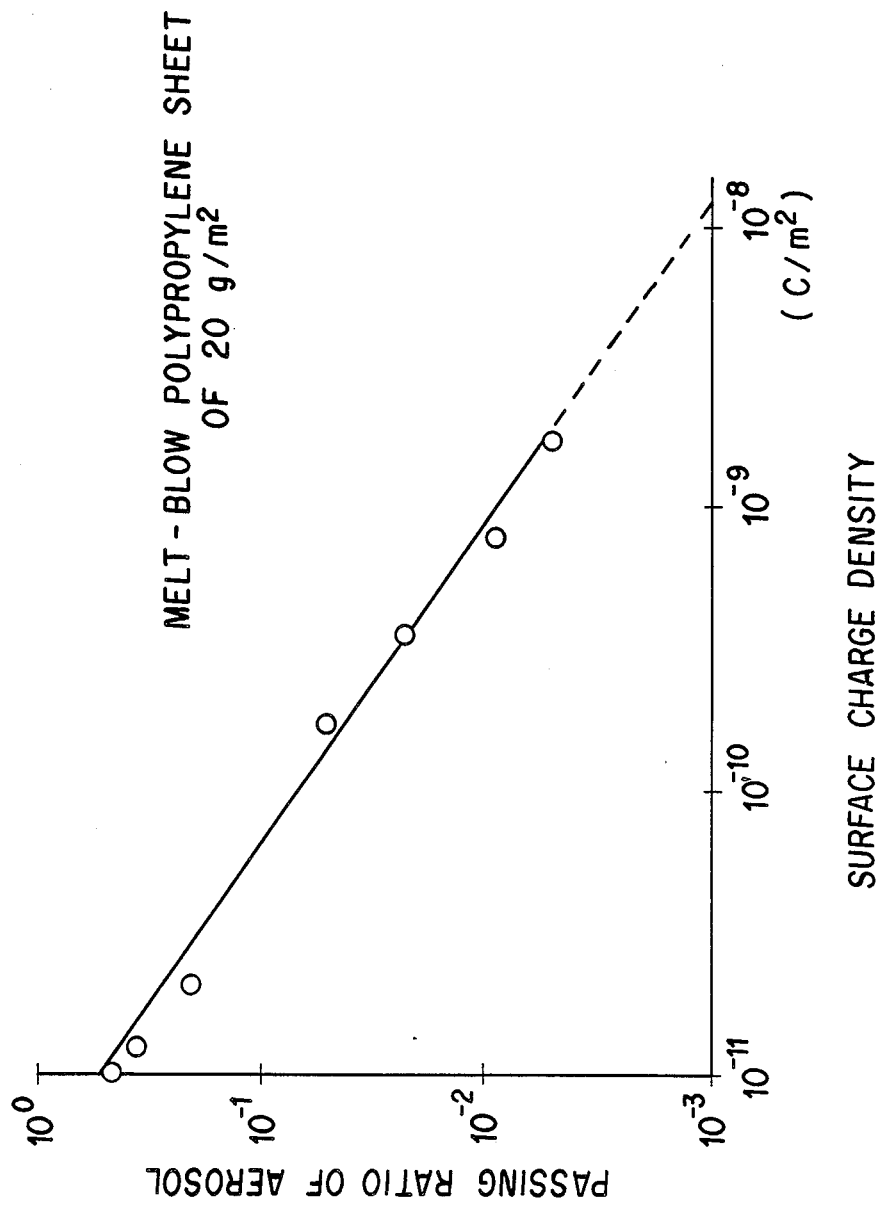

FIG. 14 is a simplified cross-sectional illustration of an equipment for measurement of surface charge density of an electret sheet. In FIG. 14, numerals refer to the following:
18: metal plate
19: electret sheet
20: metal plate
21: condenser
22: volt meter FIG. 15 is a graph showing the relation between the efficiency with which a electret fiber sheet collects aerosol particles and the surface charge density of the electret fiber sheet.

Figure 16:
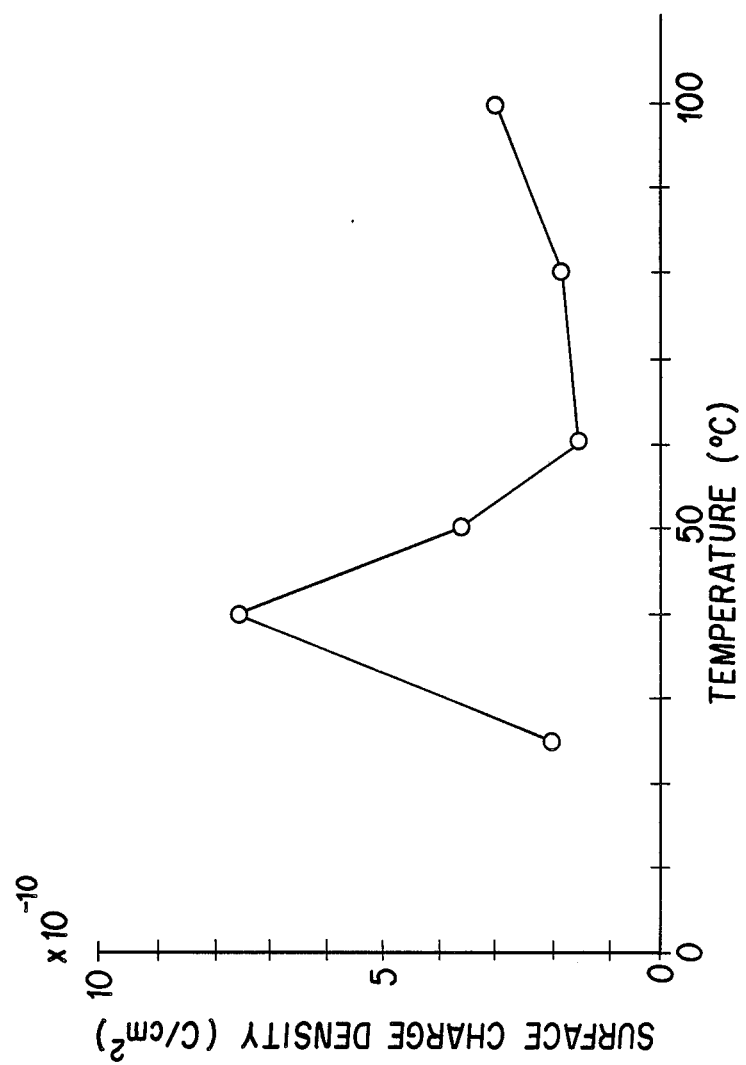

FIG. 16 is a graph showing the relation between surface charge density of an electret fiber sheet embodying the invention and temperature.

Figure 17:
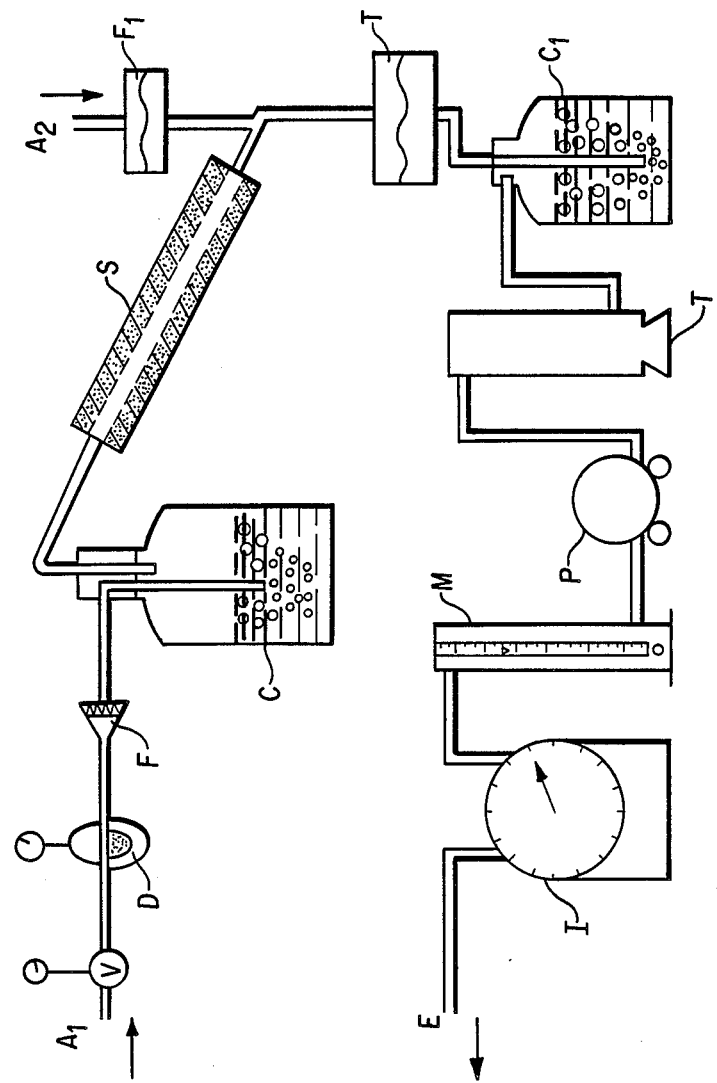

FIG. 17 is a simplified illustration of typical equipment used for evaluating the efficiency with which an electret fiber sheet collects Escherichia coli.

Figure 18:
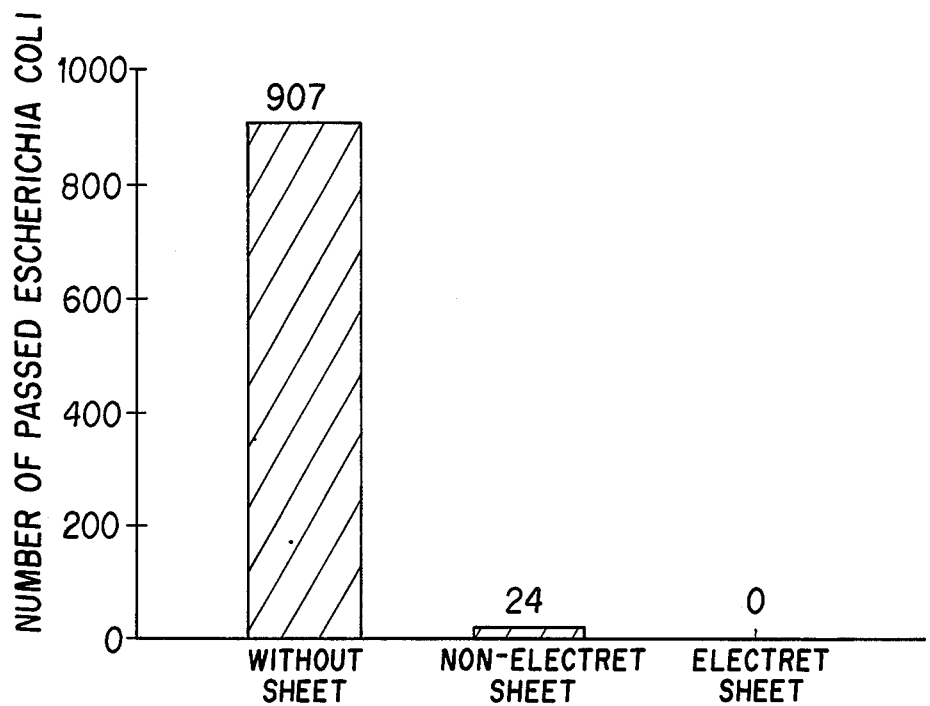

FIG. 18 shows collecting efficiency for Escherichia coli of an electret fiber sheet embodying the invention as compared with that of an enlarged fiber sheet.

Figure 19:
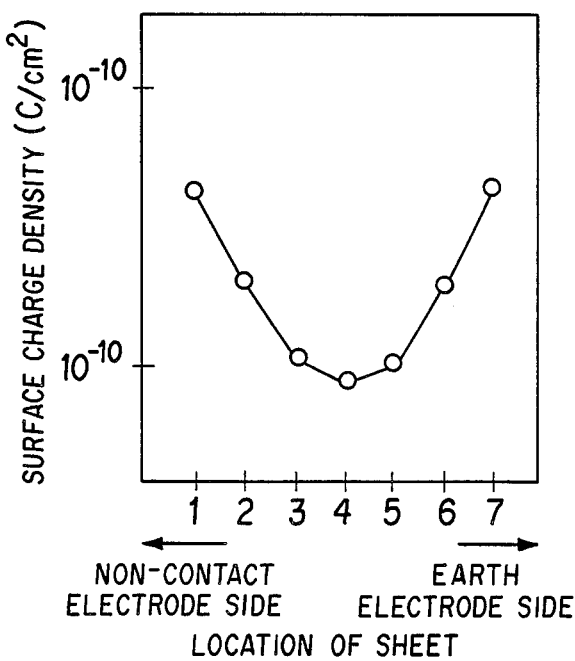

FIG. 19 is a graph showing respective surface charge density values of individual fiber sheets of a laminate in relation to their respective positions in the laminate and relative to the positions to non-contact and earth electrodes used to polarize the laminate; this graph shows the poor results achieved when polarizing a laminate of too high a total weight.

DESCRIPTION OF THE PREFERRED EMBODIMENTS

In this specification the phrase "having charges on the surfaces thereof" means "having positive or negative charges on each surface thereof", as is the case in a common electret.

Though the amount of such charges in the electret of this invention is not specifically limited, too small an amount of such charges presents a problem of performance. Thus the amount of polarized charges kept in the fiber sheet is preferably $7 \times 10^{-11}$ C/cm$^2$ or larger, more preferably $2 \times 10^{-10}$ C/cm$^2$ or larger In an electret fiber sheet according to one aspect of this invention at least the maximum activation energy of depolarization is at least 0.2 eV.

The activation energy can be determined from a graph (such as those of FIG. 7) showing the amount of depolarizition current generated by a temperature rise. The amount of the depolarization current indicates the depth of charges trapped, and has a great influence on the life span and durability of the electret.

Using the equipment shown in FIG. 6, the measurement of depolarization current versus temperature can be made by strongly nipping an electret fiber sheet 2 (4 cm diameter) placed in a heating oven 6 including a temperature controller 5, connected with a high sensitivity ammeter 7. More specifically, as the temperature of the heating oven is raised at a constant rate, for example, at a rate of 5° C./min from room temperature to a temperature close to the melting point of the sheet, the charges trapped cause electric current due to depolarization thereof. The electric current is recorded by a recorder 9 operated by a data processing unit 8 to obtain a curve of electric current against temperature in various temperature zones (FIG. 7). The polarized charge per unit area is the quotient of the area under the current curve divided by the area of the specimen subjected to the measurement.

In the rising portion of each peak in the chart, the following equation is satisfied. Thus the activation energy for the depolarization can be calculated from the gradient of the straight line obtained by plotting Ln J versus 1/T as to the rising portion of each peak.

$$\text{Ln } J = C - (\Delta E/kT)$$

wherein J is depolarization current (Ampere), C is constant, $\Delta E$ is activation energy (eV), k is Boltzmann constant and T is temperature (°K).

Supposing the plot of depolarization current against temperature shows two peaks at 92° C. and 156° C. respectively, activation energies associated with the respective peaks are obtained as follows:

Values of Ln J are plotted versus 1/T at 92, 87, 82, 77° C. and 156, 151, 146, 141° C., respectively and the activation energies can be calculated from respective slopes and the Boltzman constant, which is $8.6 \times 10^{-5}$ eV/°K.

It is important that the activation energy be at least 0.2 eV at least for one of the current peaks appearing at or above room temperature from the viewpoint of stability of the charges.

In other words, the larger the activation energy, the longer the life span of the electret. For this reason, an electret fiber sheet in accordance with the invention preferably has an activation energy of at least 0.5 eV, particularly preferably at least 0.7, and additionally shows excellent heat and chemical resistances.

The higher the temperature region where a peak appears, the longer the life span of the electret. A sheet having the above-mentioned temperature region at or above 50° C., preferably at or above 80° C., particularly above 130° C. shows excellent durability and stability.

Further, the electrical performance of an electret sheet is superior when the amount of polarized charges is larger. This amount corresponds to the area under the chart of depolarization current versus temperature. In a case where minus current appears, this area should be the summation of absolute value for the entire temperature range over which depolarization occurs. Thus, one aspect of the invention provides an electret fiber sheet having polarized charges on the surfaces thereof, the total charges per unit area of the sheet having at least $7 \times 10^{-11}$ c/m$^2$, preferably at least $2 \times 10^{-10}$ C/cm$^2$, particularly at least $5 \times 10^{-10}$ C/cm$^2$. An especially preferred electret fiber sheet in accordance with the invention has polarized charges on the surfaces thereof, a total charge per unit area of the sheet $7 \times 10^{11}$ C/cm$^2$ and at least a maximum activation energy of depolarization of at least 0.2 eV.

Another preferred feature of the electret fiber sheet of this invention is the presence of an electric field distribution in the fiber sheet in which polarized charges 1 are oriented in one direction as shown in FIGS. 1, 2 and 5.

A conventional electret fiber sheet does not have such an electric field distribution, but has distribution as shown in FIG. 3. The conventional sheet does not have characteristic electrical properties of a sheet embodying the invention as mentioned above.

FIG. 4 is a simplified illustration showing directions of respective electric power vectors represented by vector lines (arrows) respectively generated by polarized charges 1 kept by electret fiber filaments constituting the conventional electret sheet of FIG. 3. As is apparent from this Figure, the direction of polarization of each fiber is random and hence the vectors are offset relative to one another to provide an electric field which is weak and which rapidly dissipate with lapse of time. For this reason, this kind of electret does not have a durability for long-term use. This orientation in one direction of polarized charges in an electret fiber sheet embodying the invention, is a factor providing the above-mentioned especially excellent durability and electrical properties.

An electret sheet embodying this invention has excellent characteristics even as a single piece thereof. However, integration or lamination of a plurality of pieces of the sheet provides a material having longer life span and a better durability against external conditions.

For example, FIG. 8 shows an illustration of lines of electric power vectors in the case where the directions of orientation of polarized charges 1 are the same in a laminate structure comprising three pieces each of an electret sheet embodying this invention. However, alternatively there may be provided a laminate structure in which the directions of vector lines are mutually reversed between respective sheets. An improvement in the durability as mentioned above of a material of this invention can be achieved by a structure have any one of these field distribution.

FIG. 9 is a rough illustration of a typical apparatus for carrying out a process for producing an electret fiber sheet of this invention. A high voltage generator, 10 is connected between a non-contact type high voltage application needle electrode 11 and an earth 14. Between the needle electrode 11 and earth 14 are disposed an earth electrode 12, a supplemental material 13 placed on the earth electrode 12 and a fiber sheet 15 having one surface in contact with the supplemental material 13 and its opposite surface facing needle electrode 11 and spaced from it.

In order to enable the electret formation to be efficiently conducted, it is important to use a fiber sheet having a weight of 80 g/m² or less. Less than 60 g/m² is more preferred. When it exceeds 80 g/m², a sufficiently compensatory charge cannot be obtained from the earth electrode, leading to lowering of the surface charge density. Moreover, glow discharge tends to occur easily. Thus, too large a weight of the fiber sheet is not preferred.

In addition, in order to obtain a electret fiber sheet having a large amount of polarized charges and a large surface charge density, it is important to use a fiber sheet having a covering factor of 60% or higher. 80% or higher is more preferred. When it is less than 60%, the amount of surface charge density cannot be large, because charges to be trapped pass through the openings between the fibers of the sheet. To make the weight of the fiber sheet small and to make the covering factor large, the thickness of the composed fibers is important. The fibers are preferably 3 denier or less, more preferably 1 denier or less, especially 0.5 denier or less.

Equipment for measurement of the surface charge density is shown in FIG. 14. An electret fiber sheet 19 is placed on an earth metallic plate 18, and another metallic plate 20 is brought into contact with the electret sheet 19 to generate a counter charge in the metallic plate 20 connected to a condenser 21. By reading voltage of the condenser 21 on volt meter 22, the surface charge density can be calculated as follows.

Surface charge density = $C \times V/A$
C: Capacity of condenser (F)
V: Voltage
A: Surface area of the electret sheet The surface charge density has similar effect to the total charge density, however it can be determined much more easily than the total charge density. Therefore it is often convenient to use the former in place of the latter.

A graph of collection efficiency (ie "passing ratio", representing the proportional amount of aerosol particles passing through an electret fiber sheet) versus surface charge density is shown in FIG. 15. A drastic increase in the collection efficiency with increasing surface charge density can be observed.

The apparent density of the fiber sheet to be polarized is preferably at least 0.05 g/cm³, especially at least 0.1 g/cm³ in order to enable it to be highly polarized. If it is small, the thickness of the sheet become large and the applied charge cannot enter into the inner part of the fiber sheet because it is trapped only at the surface portion. Further, no sufficient compensatory charge cannot be obtained from the earth electrode, leading to lowering of the surface charge density.

The absolute value of voltage application should be 3 kV/cm or higher, preferably 5 kV/cm or higher. The distance between the voltage-application electrode and the fiber sheet is preferably at least 5 mm may be longer. A field strength lower than 3 kV/cm causes a difficulty in increasing the surface charge density. The effect of the applied voltage on the total charge is shown in FIG. 7, where the area under respective curves represents the total charge for each applied voltage indicated.

A distance of shorter than 5 mm cause glow discharge, leading to no increase in the surface charge density.

When a two-stage surface treatment is adopted in which, say a negative high voltage is applied to one surface while a positive high voltage is then applied to the reverse surface, highly polarized charges are obtained. Either order of the two step high voltage application may be applied. The negative high voltage application is more effective than the positive high voltage application. The discharge current should be from $10^{-6}$ to $10^{-2}$ mA/cm² inclusive. A discharge current higher than $1 \times 10^{-2}$ mA/cm² causes glow discharge, which bring about a lowering a surface charge density. Of course, a discharge current density lower than $10^{-6}$ mA/cm² also brings about a lowering of the surface charge density. A preferred range of discharge current density values is from $10^{-5}$ to $10^{-3}$ mA/cm² inclusive.

To obtain high surface charge density, it is effective to dispose a special type of supplemental material between the fiber sheet and the earth electrode. FIG. 10 shows a graph of surface charge density versus specific resistance, ie volume resistivity, of the supplemental material. The respective curves correspond to surface charge densities of the front surface and the back surface, respectively. From FIG. 10, it is obvious that a semiconductive or dielectric material having volume resistivity more than $10^{-1}$ Ω.cm, especially $10^{-1}$ to $10^9$ Ω.cm is effective as the supplemental material.

As the semiconductive material, either a solid or liquid material may be used. For example, a film containing minute particles such as carbon particles or metallic particles dispersed therein, paint, water or alcohol containing a small amount of soluble electro conductive material may be used.

As the dielectric material, an inorganic material or a polymer such as a polyolefin, fluororesin, polyester or polyamide may be used.

FIG. 11 shows an alternative example of equipment to that shown in FIG. 9 for carrying out a process of this invention.

A metal container 16 serving as an earth electrode and connected with ground 14 contains an electrode liquid 17 in contact with a fiber sheet 13 in a manner such that which only one surface of the fiber sheet 13 is in contact with the liquid surface. In that state, the voltage generated by a high DC voltage generator 10 is applied through a non-contact high voltage electrode 11 to the fiber sheet 13 to produce an electret fiber sheet. Examples of the electrode liquid are water (which may contain a surface active agent) and organic liquid such as acetone and alcohols. The liquid serves as a supplemental material. The liquid not only prevents glow discharge between the two electrode but also makes the contacting area with the fiber sheet 13 very large as shown in FIG. 12. For that reason, a high voltage can be supplied without glow discharge and the electric charge can be easily and deeply accepted into the fiber through the large contacting area.

In this case, it is desired to avoid infiltration of the electrode liquid up to the other surface of the fiber sheet, namely the upper surface of the fiber sheet, lest the liquid should cover the upper surface. If the upper surface of the fiber sheet is covered with the liquid, the effect of electret formation is adversely lowered. Also to avoid adverse lowering of the effect of electret formation, it is preferred to use a fiber sheet having a covering factor of 60% or higher.

The temperature of the earth electrode at the high voltage application is desirably to be in a range of from the glass transition temperature to the melting point of the fiber sheet. When a high voltage is applied at such a temperature, an electret fiber sheet which has a high surface charge density and a deeply trapped charge and the charge on which scarcely changes with the lapse of time can be obtained. FIG. 16 shows a relation between surface charge density and temperature at the high voltage application.

The period of voltage application is usually 5 seconds or longer, preferably 10 to 120 seconds. Of course, we can apply a period more than 120 minutes, however, in most cases, the sheet becomes saturated with charge and the effect is complete in less than 10 second and too long time causes slight decrease of the surface charge density.

Examples of the non-contact electrode employable in the process of the present invention are a needle electrode and a wire electrode. As an earth electrode, materials having volume resistivity lower than $10^{-4}$ Ω.cm are preferable.

As the fiber sheet, woven or knitted fabrics can be used as can non-woven fabrics. As the woven or knitted fabrics, those made of filament yarn are more preferable than those made of spun yarn, because a large contact area with the earth electrode can be easily obtained.

As the non-woven fiber sheet, melt-blown fiber sheets are preferable, because average fiber diameters less than 10 micrometers and large cover factors can be easily obtained. Moreover, melt-blown fiber sheet is suitable for a filter for an industrial clean room because it has a high dust collection efficiency and low pressure drop.

Any material may be applicable as the fiber sheet according to the present invention, but it should have a volume resistivity of $10^{13}$ Ω.cm or higher. Examples of such a material include fibers made from any one of synthetic polymers such as polyolefins, polyesters, polycarbonate, polyfluororesins, polyacrylonitrile resins, polyamide resins and polyvinyl chloride resins; and glass and other inorganic compounds. Among them polyolefin is preferred because it has high electric resistance and has no polarity. The above-mentioned fibers may have any shape so long as they have a fibrous form.

Further, the fibers which can be used in an electret sheet of this invention include those having a material covering thereon and containing an organic compound of $10^{13}$ Ω.cm or higher in volume resistivity, for example, core-sheath type fibers.

The present invention aims at providing an electret fiber sheet having a capacity to remain stable and retain high charge for a long period, and having high chemical and heat resistances, and excellent durability as compared with conventional electret sheets. Electret fiber sheet embodying this invention find ability in a wide variety of applications as filter materials; adsorbing materials; masks; sensors such as radiation dosimeters, temperature sensors, microphones, and headphones and medical materials such as gauzes, and bone growth promotors. Processes for producing electret fiber sheets embodying the invention will now be described in more detail with reference to the following Examples.

In these Examples, the volume resistivity was determined according to the method of JIS (Japanese Industrial Standard) C 2318 or JIS C 2525.

The covering factor was determined by counting light and shade sections (1 mm×1 mm) of a plotting paper put on the enlarged (magnification was ×20) shade of a specimen (2 cm×2 cm) made with enlarging projector. The covering factor was calculated according to the following equation, wherein B is the number of light sections formed by passage of light and C is the number of shade sections formed by shielding of light by the fiber:

Covering Factor (%) = [C / (B + C)] × 100

The apparent density of the sheet was determined by the following equation:

Apparent Density (g/cm$^3$) = D/(E×F)

D: weight per unit area (g/cm$^2$)
E: thickness (cm)
F: unit area (1 cm$^2$)

The thickness was measured under a load of 50 g/cm$^2$

EXAMPLE 1

A melt-blown polypropylene fiber non-woven fabric having a weight of 20 g/m$^2$, average fiber thickness of 0.2 denier, covering factor of 99%, an apparent density of 0.129 g/cm$^3$, and a volume resistivity of $10^{16}$ Ω.cm was used as the fiber sheet for formation of an electret with equipment as shown in FIG. 9.

One iron needle electrode having a volume resistivity of $10^{-6}$ Ω.cm was used as the voltage-application electrode. A 20 cm-square iron plate was used as the earth electrode. A 20 cm-square semiconductive sheet composed of polyvinyl chloride and carbon particles uniformly dispersed therein and having a thickness of 0.5 mm and a volume resistivity of 104 Ω.cm was disposed as the supplemental material between the earth electrode and the melt-blown fiber sheet. The distance between the needle electrode and the fiber sheet was set at about 30 mm. The fiber sheet was treated for 30 seconds in an atmosphere of 25° C. at an applied voltage of −30 kV, i.e., a electric field strength of 10 kV/cm. The discharge current was $3.5 \times 10^{-4}$ mA/cm$^2$ at the treatment.

The obtained electret fiber sheet had peaks of the depolarization chart at 90° C. and 150° C., and activation energies of the respective peaks of 0.45 eV and 0.71 eV. The total amount per unit area of depolarization charge (ie polarized charge as determined from a depolarization chart) was $7.2 \times 10^{-10}$ C/cm$^2$, and the amount per unit area of the depolarization charges above 130° C. was $3.8 \times 10^{-10}$ C/cm$^2$. The surface charge density was $7.5 \times 10^{-10}$ C/cm$^2$ at the front surface and $-8.5 \times 10^{-10}$ C/cm$^2$ at the back surface. The sheet showed almost no change of the depolarization chart after standing in air at 20° C., 60RH for two months.

EXAMPLE 2

A melt-blown polypropylene fiber sheet used in Example 1 was used.

One surface of the sheet was contacted with an electrode of water having a volume resistivity of $5 \times 10^5$ Ω.cm and a voltage of $-30$ kV are applied with a needle electrode for 60 seconds. The depth of the water bath was 2 cm. During this treatment, the water temperature was kept at 20° C. and the distance between the needle electrode and the fiber sheet was kept to 5 cm.

The electric field strength and the discharge current density were 6 kV/cm and $2.8 \times 10^{-4}$ mA/cm$^2$, respectively.

In the obtained fiber sheet, the amount of electric current generated by depolarization of the polarized charges by a temperature rise was recorded. The temperatures of the peaks of the depolarization chart were 91° C. and 152° C., and the activation energies were 0.51 eV and 0.79 eV. The amount of polarized charge per unit area which appeared above 130° C. was $4.5 \times 10^{-10}$ C/cm$^2$. This sheet showed almost no change of the depolarization chart even after leaving at 20° C., 95%RH for two months.

EXAMPLE 3

A polypropylene non-woven fabric having a weight of 40 g/m$^2$, average fiber thickness of 0.9 denier, covering factor of 99%, an apparent density of 0.125 g/cm$^3$, and a volume resistivity of $10^{16}$ Ω.cm was used as the fiber sheet for formation of an electret with equipment as shown in FIG. 9.

One stainless steel needle electrode having a volume resistivity of $10^{-6}$ Ω.cm was used as the voltage-application electrode. A 20 cm-square stainless steel plate was used as the earth electrode. No supplemental material between the earth electrode and the fiber sheet was used. The distance between the needle electrode and the fiber sheet was set at about 30 mm. The fiber sheet was treated for 30 seconds in an atmosphere of 25° C. at an applied voltage of $-20$ kV, i.e., an electric field strength of 6.7 kV/cm. The discharge current was $2.5 \times 10^{-4}$ mA/cm$^2$ at the treatment.

The obtained electret fiber sheet had peaks of the depolarization chart at 87° C. and 145° C., and activation energies of the respective peaks of 0.25 eV and 0.45 eV. The total amount per unit area of the depolarization charge was $3.9 \times 10^{-10}$ C/cm$^2$, and the amount per unit area of the depolarization charge above 130° C. was $1.7 \times 10^{-10}$ C/cm$^2$. The sheet showed almost no change of the depolarization chart after standing in air at 20° C., 60RH for one month.

EXAMPLE 4

The electret fiber sheet obtained in Example 1 was turned upside down and again subjected to a further applied voltage of $+20$ kV (electric field strength of 6.6 kV/cm, discharge current density of $5 \times 10^{-5}$ mA/cm$^2$) was applied to the reverse surface of the sheet for 30 seconds.

Current peaks for the electret fiber sheet thus obtained were present at 92° C. and 153° C. The activation energies in the respective peaks were 0.55 and 0.81 eV. The total amount per unit area of polarized charge in this sheet was $1.8 \times 10^{-9}$ C/cm$^2$, and the amount per unit area of polarized charge appearing above 130° C. was $5.5 \times 10^{-10}$ C/cm$^2$.

After the sheet was allowed to stand at 30° C and at 95% RH for two months, the measurement of polarized charge show substantially no change in the amount.

EXAMPLE 5

Five pieces of the electret fiber sheet obtained in Example 1 were laminated in such a way that each charge polarization on those respective surfaces of every pair of pieces which were mutually adjacent were heteropolar with respect to one another (the same direction of vector lines as shown in FIG. 8).

The dust collection efficiency of this sheet was evaluated.

The evaluation was made in such a way that an air stream having a polystyrene aerosol of 0.3 μm (polystyrene uniform latex particles supplied by Dow Chemical, USA) in average particle size dispersed therein was passed through the electret fiber sheet at a speed of 2.5 cm/sec. The number of particles in the air stream was counted (Particle Counter manufactured by Hitachi, Ltd.) before and after passing the electret fiber sheet.

The electret fiber sheet of Example 1 showed a dust collection efficiency of 99.997% and pressure drop of 4.5 mm.aq. In contrast, a HEPA (high efficiency particulate cut) filter (sold by NIHON MUKI SENI K.K.) made of glass micro fiber, showed a dust collection efficiency of 99.987% and pressure drop 21 mm.aq. In the electret fiber sheet of this example, no changes of the dust collection efficiency and the pressure drop were observed after immersion in methanol for a week or after standing in 100° C. hot air for a week.

EXAMPLE 6

Two pieces of the electret fiber sheet obtained in Example 1 were laminated so that the confronting surfaces of each sheet had the same polarization.

The collection efficiency of this sheet for Escherichia coli was evaluated using the apparatus shown in FIG. 17.

This apparatus comprises an air inlet A, to a source of Escherichia coli in a container C via a valve V, drier D and Filter F, and an air inlet $A_2$ leading to a tert piece T (consisting of the electret fiber sheet to be terted) via a filter F, having a weight of 100 g/m$^2$. The Escherichia coli from container C (in which they are present in an amount of $5 \times 10^8$ / 500 ml of a liquid medium) are led via a silica gel column S into the air stream entering at $A_2$ and are filtered by the tert piece T. Any Escherichia coli passing through the tert piece are collected in a container $C_1$ containing cultivation liquid. After cultivation to provide a measurable amount, the Escherichia coli are assayed to determine the collecting efficiency. A trap T prevent cultivation liquid from progressing further while the air is exhausted by a pump P, through a flow meter M and integral flow meter I to an exit E.

An air stream (100 liters) having Escherichia coli dispersed therein was passed through the electret fiber sheet at a speed of 2.5 cm/sec and the number of Escherichia coli in the air stream passed through the electret fiber sheet was estimated by cultivation.

No Escherichia coli was counted when the above laminated electret fiber sheet was used. On the other hand, 24 Escherichia coli bacilli were counted when using the same melt-blown fiber sheet but having no polarized charges thereon, in place of the above sheet. 907 Escherichia coli bacilli were counted when no filter was used. These results are shown in FIG. 18.

EXAMPLE 7

Polypropylene fiber (volume resistivity $10^{16}$ Ω.cm) plain fabric composed of 75 denier multifilament yarn as warp and weft having a warp density of 101 yarns/inch (about 40 yarns/cm) and a weft density of 79 yarns/inch (about 31 yarns/cm) was used. The woven fabric had a weight of 79 g/m$^2$, and a covering factor of 98%, was composed of fiber having a denier of 0.8d, and had an apparent density of 0.79 g/cm$^3$. The plain fabric was polarized for 40 seconds using the equipment shown in FIG. 9 using an applied voltage of −36 kV. As the supplemental material, polyethylene film (100 micrometer thickness) containing metallic power uniformly dispersed therein and having volume resistivity of $10^6$ Ω.cm was used. The electrical field strength and the discharge current density were −12 kV/cm and $3.5 \times 10^{-4}$ mA/cm$^2$, respectively. The peak temperatures of the discharge current were 91° C. and 151° C. and the respective activation energies were 0.35 and 0.62 eV.

COMPARATIVE EXAMPLE 1

This process illustrates the poor effects by randomly disposing electret fibers obtained from an electret film, as described in US-A-3998916.

A polypropylene electret film was cut. The resulting slit film of 32 μm in width and 10 μm in thickness was formed, with a card, into a non-woven fabric sheet having an areal weight of 360 g/m$^2$ (outside the process of the invention) and a thickness of 6.5 mm. The depolarization current for the sheet thus obtained was measured to obtain a chart as shown in FIG. 13. This result suggested that the electric field distribution of the sheet was random. Thus, the chart had no characteristic current peaks as realized by an electret fiber sheet embodying the present invention.

The dust collection efficiency of this sheet was evaluated according to the method of Example 5. It was 99.850%. The dust collection efficiency of this sheet after it immersion in methanol for one week was 90.72%. This means that the polarized charge was not stable in this sheet.

COMPARATIVE EXAMPLE 2

This Example illustrates the adverse effects of using contact electrode such as described JA-B-4433/74.

The melt-blown fiber sheet used in Example 1 was sandwiched between two 20 cm square polymethylmethacrylate (PMMA) plates of 5 mm thickness. The two PMMA plate were further sandwiched between two metallic electrode plates and −20 kV was charged between the two electrodes. No discharge current was observed. Though the depolarization current versus temperature was measured, the peak temperature and activation energy were not clearly measurable. The amount of depolarized charge was only $5 \times 10^{-11}$ C/cm$^2$. Further, lowering of the amount of polarized charge was observed after standing at 20° C., 65%RH for one week.

COMPARATIVE EXAMPLE 3

This Example illustrate the adverse effects of using a fiber sheet which is too heavy.

A non-woven sheet having weight of 140 g/m$^2$ was made by laminating seven non-woven sheet each having a weight of 20 g/m$^2$. The laminated mon-woven sheet had an apparent density of 0.09 g/cm$^3$, covering factor of 98%, average fiber thickness of 2.5 denier and volume resistivity of the fiber material (polypropylene) of $10^{16}$ Ω.cm.

Although high voltage application was attempted using tried to this laminated non-woven sheet in the same way as Example 1, it caused glow discharge. The above experiment was repeated changing the applied voltage of 10 kV/cm to 6. The current density was $1.2 \times 10^{-4}$ mA/cm$^2$. The depolarization versus temperature curve showed no clear peak temperature and activation energy, and the total amount of the depolarized charge was only $6 \times 10^{-11}$ C/cm$^2$. Further, the individual sheets of the laminate were separated from one another (de-laminated), and their respective surface charge densities evaluated. The total amount per unit area of polarized charge was only $1.5 \times 10^{-11}$ C/cm$^2$. The surface charges of the respective component sheets of the laminate are shown in FIG. 19.

COMPARATIVE EXAMPLE 4

An electret fiber sheet was made by applying a high voltage during a melt-blow process for preparing polypropylene fibers. The distance between the needle electrode and earth electrode was 5 cm and the applied voltage was −45 kV (electric field strength: 9 kV/cm). An electret sheet was made by collecting the melt-blown fibers on a conveyer. The average fiber thickness of the fibers was 0.2 denier and the weight of the sheet was 80 g/m$^2$.

The plot of depolarized charge versus temperature was similar to that of Comparative Example 1, which is shown in FIG. 13.

This process illustrates the poor effects which are obtained when applying a high voltage during a melt-blow process such as that described in US-A-4215682.

We claim:
1. An electret fiber sheet having polarized charges of ordered orientation on the surfaces thereof, said electric fiber sheet being made from a sheet having a weight of 80 g/cm$^2$ or less and a covering factor of 60% or higher, wherein said electret fiber sheet has at least one measurable activation energy of depolarization of at least 0.2 eV.

2. An electret fiber sheet having polarized charges of ordered orientation on opposite surfaces thereof, said fiber sheet being made from a sheet having a weight of 80 g/cm$^2$ or less and a covering factor of 60% or higher, wherein the said electret fiber sheet has a total amount of polarized charge per unit area of at least $[7 \times 10^{-11}]2 \times 10^{-10}$ C/cm$^2$.

3. An electret fiber sheet as claimed in claim 2, wherein said total amount of polarized charge per unit area is at least $5 \times 10^{-10}$ C/cm$^2$.

4. An electret fiber sheet as claimed in claim 1, wherein the total charge per unit area of the sheet is at least $[7 \times 10^{-11}] 2 \times 10^{-10}$ C/cm$^2$.

5. An electret fiber sheet as claimed in claim 1, wherein the peak temperature of the depolarization is at least 50° C.

6. An electret fiber sheet according to claim 4, wherein the peak temperature of the depolarization is at least 80° C.

7. An electret fiber sheet as claimed in claim 1, wherein the fiber sheet is a non-woven fiber sheet.

8. An electret fiber sheet as claimed in claim 7, wherein the non-woven fiber sheet is a melt-blown fiber sheet.

9. An electret fiber sheet as claimed in claim 1, wherein said one measurable activation energy of depolarization is at least 0.5 eV.

10. A material comprising a laminate of electret fiber sheets, each of which comprises an electret fiber sheet according to any of claim 1 to 9.

11. A process for producing an electret fiber sheet having polarized charges of ordered orientation and having either at least one measurable activation energy of depolarization of at least 0.2 eV or a total amount of polarized charge per unit area of at least $2 \times 10^{-10}$ C/cm$^2$ said process comprising the steps of:

placing a fiber sheet having a weight of 80 g/m$^2$ or less and a covering factor of 60% or higher between a non-contact type voltage-application electrode and an earth electrode facing one another;

placing a supplemental material having a volume resistivity higher than that of said earth electrode and lower than that of said fiber sheet between said earth electrode and said fiber sheet; and applying voltage of at least 3kV at an electric current density of at least $1 \times 10^{-6}$ mA/cm$^2$.

12. A process as claimed in claim 11, wherein a supplemental material having a volume resistivity higher than that of said earth electrode and lower than that of said fiber sheet is additionally disposed between said earth electrode and said fiber sheet.

13. A process as claimed in claim 11, wherein the volume resistivity of the supplemental material is in a range from $10^{-1}$ to $10^{10}$ Ω.cm inclusive.

14. A process as claimed in claim 11 or claim 13, wherein said supplemental material is a liquid.

15. A process as claimed in claim 11, wherein said fiber sheet has an apparent density of at least 0.05 g/cm$^3$ 16. A process as claimed in any of claim 11, which is carried out at a temperature between the glass-transition temperature and melt point of the material of the fiber sheet.

17. A process as claimed in any of claim 11, wherein the distance between the fiber sheet and the voltage-application electrode is at least 5 mm.

18. A process as claimed in any of claim 11, which includes the steps of
(a) placing the fiber sheet between the voltage-application and the opposite face of the fiber sheet faces the earth electrode,
(b) applying a voltage of a given polarity between the voltage-application and earth electrodes,
(c) reversing the fiber sheet so that the said one face thereof faces the earth electrode and the said opposite face thereof faces the voltage-application electrode, and
(d) applying a voltage of a polarity opposite to that of the said given polarity applied in step (b) between the voltage application and earth electrodes.

* * * * *